United States Patent
Li et al.

(10) Patent No.: US 10,484,663 B2
(45) Date of Patent: Nov. 19, 2019

(54) INFORMATION PROCESSING APPARATUS AND INFORMATION PROCESSING METHOD

(71) Applicant: SONY CORPORATION, Tokyo (JP)

(72) Inventors: Zhaoxin Li, Beijing (CN); Chongyu Chen, Beijing (CN); Lei Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 15/841,431

(22) Filed: Dec. 14, 2017

(65) Prior Publication Data

US 2018/0255283 A1 Sep. 6, 2018

(30) Foreign Application Priority Data

Mar. 3, 2017 (CN) .......................... 2017 1 0123943

(51) Int. Cl.
| | |
|---|---|
| *H04N 13/128* | (2018.01) |
| *G06K 9/62* | (2006.01) |
| *H04N 13/271* | (2018.01) |
| *H04N 13/00* | (2018.01) |
| *H04N 13/204* | (2018.01) |

(52) U.S. Cl.
CPC ......... *H04N 13/128* (2018.05); *G06K 9/6256* (2013.01); *G06K 9/6267* (2013.01); *H04N 13/271* (2018.05); *H04N 13/204* (2018.05); *H04N 2013/0081* (2013.01)

(58) Field of Classification Search
CPC .. H04N 13/128; H04N 13/271; H04N 13/204; H04N 2013/0081; G06K 9/6256; G06K 9/6267

See application file for complete search history.

(56) References Cited

U.S. PATENT DOCUMENTS

| | | | | |
|---|---|---|---|---|
| 2007/0031037 | A1* | 2/2007 | Blake | G06K 9/00234 382/173 |
| 2010/0220932 | A1* | 9/2010 | Zhang | G06K 9/6297 382/209 |
| 2015/0178908 | A1* | 6/2015 | Jesenko | G06T 19/20 433/29 |
| 2018/0139431 | A1* | 5/2018 | Simek | H04N 13/232 |

\* cited by examiner

*Primary Examiner* — Leon Flores
(74) *Attorney, Agent, or Firm* — Xsensus LLP (57) ABSTRACT

The disclosure relates to an information processing apparatus and information processing method. The information processing apparatus according to an embodiment includes a processing circuitry configured to: derive a disparity map of an object based on at least two images among multi-view images of the object; estimate confidences of disparity values in the disparity map using a classifier trained in advance; and perform an optimization process on the disparity map based on disparity values of reference pixels having confidences higher than a predetermined level.

19 Claims, 11 Drawing Sheets

INFORMATION PROCESSING APPARATUS AND INFORMATION PROCESSING METHOD

FIELD

The present disclosure generally relates to information processing, and more particularly to an information processing apparatus and an information processing method relating to multi-view images.

BACKGROUND

There has been a scheme for obtaining a disparity map based on multi-view images and a scheme for obtaining a depth map based on a disparity map and performing three-dimensional reconstruction. In generating a disparity map, a disparity value of each pixel in the disparity map is determined by determining a pixel correspondence between a left image and a right image.

SUMMARY

Some factors in multi-view images for generating a disparity map, such as low texture surfaces, repetitive patterns, and occlusions (which widely exist in the real world), affect the accuracy of estimation on a pixel correspondence between views.

A brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as a preamble of the detailed description later.

According to an embodiment, an information processing apparatus is provided, which includes a processing circuitry. The processing circuitry is configured to: derive a disparity map of an object based on at least two images among multi-view images of the object; estimate confidences of disparity values in the disparity map using a classifier trained in advance; and perform an optimization process on the disparity map based on disparity values of reference pixels having confidences higher than a predetermined level.

According to another embodiment, an information processing method is provided, which includes the steps of: deriving a disparity map of an object based on at least two images among multi-view images of the object; estimating confidences of disparity values in the disparity map using a classifier trained in advance; and performing an optimization process on the disparity map based on disparity values of reference pixels having confidences higher than a predetermined level.

According to yet another embodiment, an information processing apparatus is provided, which includes a processing circuitry. The processing circuitry is configured to: derive a disparity map of an object based on at least two images among multi-view images of the object; estimate confidences of disparity values in the disparity map using a classifier trained in advance; generate a depth map of the object based on the disparity map; and perform a three-dimensional reconstruction of the object from the depth map based on the confidences.

According to still another embodiment, an information processing method is provided, which includes the steps of: deriving a disparity map of an object based on at least two images among multi-view images of the object; estimating confidences of disparity values in the disparity map using a classifier trained in advance; generating a depth map of the object based on the disparity map; and performing a three-dimensional reconstruction of the object from the depth map based on the confidences.

According to embodiments of the present disclosure, confidences of disparity values are obtained by means of learning, and an optimization process of the disparity map or a three-dimensional reconstruction of an object is performed according to the confidences, thereby improving a quality of the disparity map or the reconstructed three-dimensional model.

BRIEF DESCRIPTION OF THE DRAWINGS

The present disclosure can be understood better with reference to the description given in conjunction with the drawings in the following. The same or similar element is indicated by the same or similar reference numeral throughout all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Hereinafter embodiments of the present disclosure are described with reference to the drawings. Elements and features described in one drawing or one embodiment of the present disclosure may be combined with elements and features illustrated in one or more other drawings or embodiments. It should be noted that, for clarity, indication and description of components and processing irrelevant to the present disclosure and known by those skilled in the art are omitted in the drawings and the illustration.

Figure 1:
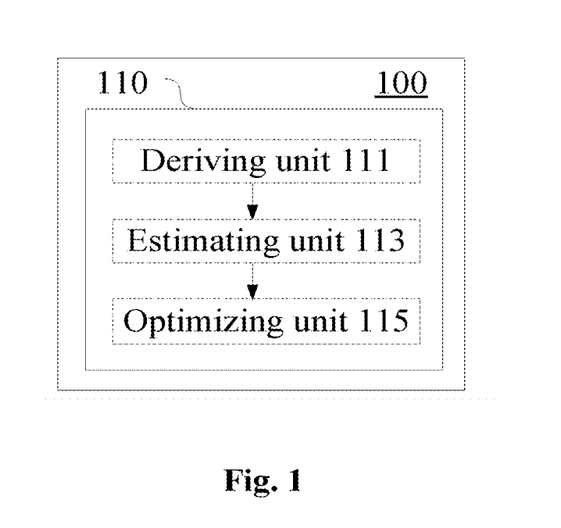
FIG. 1 is a block diagram showing a configuration example of an information processing apparatus according to an embodiment of the present disclosure.

FIG. 1 shows a configuration example of an information processing apparatus 100 according to an embodiment of the present disclosure. The information processing apparatus may be implemented as, for example, a personal computer (such as a desktop computer and a laptop computer), a work station, a game machine, a television set, a mobile terminal (such as a smart phone, a tablet computer and a portable game terminal), an image capturing device (such as a camera and a monitor) or a wearable apparatus (such as smart glasses). However, an application scope of the embodiment of the present disclosure is not limited to the aspects listed above, and may be applied to any apparatus capable of acquiring multi-view images, or an apparatus which is communicatively or electrically coupled with the apparatus capable of acquiring multi-view images to process the multi-view images.

As shown in FIG. 1, the information processing apparatus 100 according to the embodiment includes a processing circuitry 110. For example, the processing circuitry 110 may be implemented as a particular chip, a chipset, a central processing unit (CPU) or the like.

The processing circuitry 110 includes a deriving unit 111, an estimating unit 113, and an optimizing unit 115. It should be noted that, although the deriving unit 111, the estimating unit 113, and the optimizing unit 115 are shown in a form of functional blocks in the drawing, it should be understood that functions of the deriving unit 111, the estimating unit 113 and the optimizing unit 115 may also be implemented by the processing circuitry 110 as a whole, and are not necessarily implemented by actual discrete components in the processing circuitry 110. In addition, although the processing circuitry 110 is shown by one block in the diagram, the information processing apparatus 100 may include multiple processing circuitries, and functions of the deriving unit 111, the estimating unit 113 and the optimizing unit 115 may be distributed among the multiple processing circuitries, such that the multiple processing circuitries operate in cooperation to perform the functions.

The deriving unit 111 is configured to derive a disparity map of an object based on at least two images among multi-view images of the object.

The multi-view images (hereinafter also referred to as input images) include a scene of interest captured from multiple different viewing angles, in which adjacent images at least partially overlap. A disparity map may be generated based on a pair of such images, such as a left image and a right image (hereinafter also referred to as a stereo image pair). The disparity map may be derived based on multi-view images in various manners known in the art.

According to a specific embodiment, the deriving unit 111 is configured to derive the disparity map of the object by: calculating, for a target pixel in a first image among the multi-view images, matching costs between pixels in a predetermined range in a second image among the multi-view images and the target pixel; and determining a corresponding pixel of the target pixel in the second image based on the matching costs, thereby determining a disparity value of the target pixel.

The matching cost may be calculated, for example, by block-matching based on zero mean normalized cross correlation (ZNCC).

An example manner in which the disparity map of the object is derived based on two images is described below.

For a stereo image pair including a left image $I_L$: $\Omega_i \subset R^2 \to R'''$ and a right image $I_R$: $\Omega_i \subset R^2 \to R'''$, firstly, the left image $I_L$ is used as a reference image, for example. For a pixel at a given image position p having a pixel value $I_L(p)$, a window (e.g., having pixels of 15×15) with the pixel as a center is provided, and a corresponding pixel q is searched for in a disparity range of $d \in [d_{min}, d_{max}]$ in the right image $I_R$. For example, a score s(p,d) for a matching cost is calculated by ZNCC. A disparity with a maximum ZNCC score $s_{max}(p)$ may be selected using a Winner-take-all (WTA) strategy, as an optimum disparity $d_p^L$ for the pixel p in the reference image. After this process, a disparity map $D_L$ of the left image can be obtained. Then, the right image $I_R$ is set as the reference image, and a similar process is performed to obtain a disparity map $D_R$ of the right image.

It should be understood that the embodiment of the present disclosure is not limited to the specific details in the above example, such as parameter settings and processing orders.

The estimating unit 113 is configured to estimate confidences of disparity values in the disparity map derived by the deriving unit 111 using a classifier trained in advance.

Figure 14:
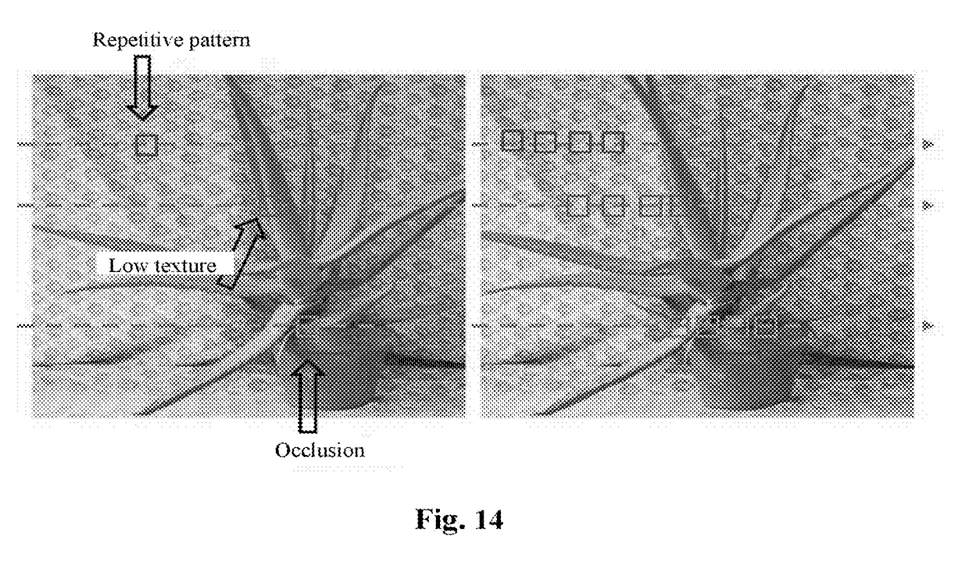
FIG. 14 is an exemplary diagram for illustrating factors related to the confidence of a disparity.

In an ideal case, the disparity map is accurate if a pixel correspondence between the left image and the right image is correctly found. However, in practice, many factors may affect correctness (a confidence) of this correspondence. For example, as shown in FIG. 14, repetitive patterns, low textures, and occlusions in an image may affect the correctness of the above-described correspondence. Thus, confidences of disparity values can be estimated based on corresponding features in an input image using a classifier trained in advance.

Figure 15:
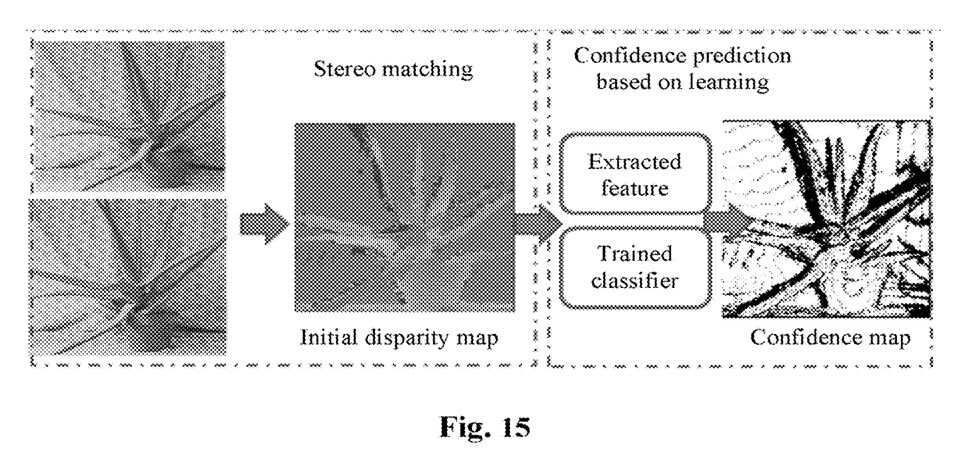
FIG. 15 is an exemplary diagram for illustrating a confidence prediction.

FIG. 15 schematically shows a process of confidence prediction based on learning. The left side of FIG. 15 corresponds to a process of deriving an initial disparity map based on the multi-view images (corresponding to processing performed by the deriving unit 111), and the right side corresponds to a confidence prediction process based on learning (corresponding to processing performed by the estimating unit 113).

As described above, in the case that the matching cost between the left image and the right image is calculated by the block-matching based on ZNCC to determine the disparity, according to an embodiment, training of the classifier and the estimating of confidences may be performed based on one or more of the following features:

a minimum cost of the block-matching, which may be expressed as $c_{min}=1-s_{max}(p)$, for example, where $s_{max}(p)$ represents a maximum score of matching cost calculated by ZNCC;

a difference between a minimum cost and a secondary minimum cost of the block-matching, which may be expressed as $MMN_p=|c_2-c_{min}|$, for example, where $c_{min}$ represents the minimum cost and $c_2$ represents the secondary-minimum cost;

a difference between a disparity value determined for a target pixel in a first image and a disparity value determined for a corresponding pixel in a second image, which may be expressed as $LRC_p=|d_p^L-D_R(p+d_p^L)|$ for example, where $d_p^L$ represents the disparity value of the pixel p in the left image, and $D_R(p+d_p^L)$ represents the disparity value of the corresponding pixel $(p+d_p^L)$ in the right image; and a difference between a disparity value of a pixel and a median disparity value of neighboring pixels of the pixel, which may be expressed as $MED_p=\min\{|d_p^L-Median_p^L|, 2\}$, for example, where $d_p^L$ represents the disparity value of the pixel p in the left image, and $Median_p^L$ represents the median disparity value of the neighboring pixels of the pixel, an upper limit 2 is set for the disparity difference, but the embodiment of the present disclosure is not limited thereto.

According to an embodiment, the classifier used by the estimating unit 113 is obtained based on a training image using a least square boosting algorithm. Corresponding features are used in a training process. As an estimating result of the estimating unit 113, for example, a confidence map $M_L$ may be obtained to give a score for correctness of the disparity value $D_L$ in the disparity map, as shown in FIG. 15. The confidence score is, for example, in a range of [0, 1], where 1 represents a highest confidence and 0 represents a lowest confidence. By using the least square boosting algorithm, the accuracy and efficiency of the processing can be improved.

In addition, training data used for training the classifier may be data from a Middlebury stereo dataset, for example.

With reference to FIG. 1 again, the optimizing unit 115 is configured to perform optimization process on the disparity map based on disparity values of reference pixels (hereinafter also referred to as "reference points") having confidences higher than a predetermined level. As described above, there are certain factors in the input image that will affect the correctness (confidence) of a disparity value in the resulting disparity map. Accordingly, optimizing the disparity map means obtaining a disparity value having higher correctness or confidence as compared with the initial disparity map. In other words, the optimizing unit 115 is configured to modify a disparity value of a pixel having a low confidence by referring to a disparity value of a pixel having a high confidence, thereby improving a quality of the disparity map.

As an example, confidences may be combined with a global stereo matching algorithm based on a Markov random field to improve the quality of the disparity map. In addition, for example, confidences may be used to adjust a semi-global stereo algorithm.

Further, according to an embodiment, the optimizing unit 115 may be configured to divide the disparity map into regions based on positions of the reference pixels, and perform optimization process on different regions in the disparity map independently. Thus, as compared with the global or semi-global schemes, the disparity map can be improved more efficiently using confidences in a local stereo matching manner.

As an example, a known local stereo matching manner may include a selection method of a support point, a Delaunay triangulation, and a maximum posteriori probability (MAP) maximization framework, and the like. The support point is selected by detecting and matching significant features. However, these features are only present in high texture regions. For low texture scenes, discriminative features are less and the feature matching contains more ambiguity.

According to an embodiment of the present disclosure, optimization process is performed based on a high confidence point extracted by learning, such that the "support points" are denser and are less sensitive to scene contents, as compared with a conventional manner.

With respect to the selection of the reference pixels, the optimizing unit 115 may be further configured to determine a pixel which satisfies the following condition, among pixels having confidences higher than a predetermined level, as the reference pixel: there are at least a predetermined number of pixels, among the neighboring pixels of the pixel, having disparity values from the pixel less than a predetermined threshold.

Specifically, for example, the following condition may be set for a reference pixel: for a pixel $p^g$ to be determined as a reference point, it is required that there are more than, for example, five other reference points in its predetermined proximity range, and a difference between a disparity value of each of these reference points and a disparity value of the pixel $p^g$ is less than a predetermined threshold, for example, 5. With this additional condition, it is equivalent to applying a spatial consistency filtering, such that noise of the reference point can be further filtered out.

In addition, according to an embodiment, the optimization process performed by the optimizing unit 115 includes: triangulating the disparity map according to the positions of the reference pixels; determining an energy function respectively for each of triangular regions with reference pixels as vertices; and optimizing a disparity value of a pixel in a corresponding triangular region based on the determined energy function.

Figure 16:
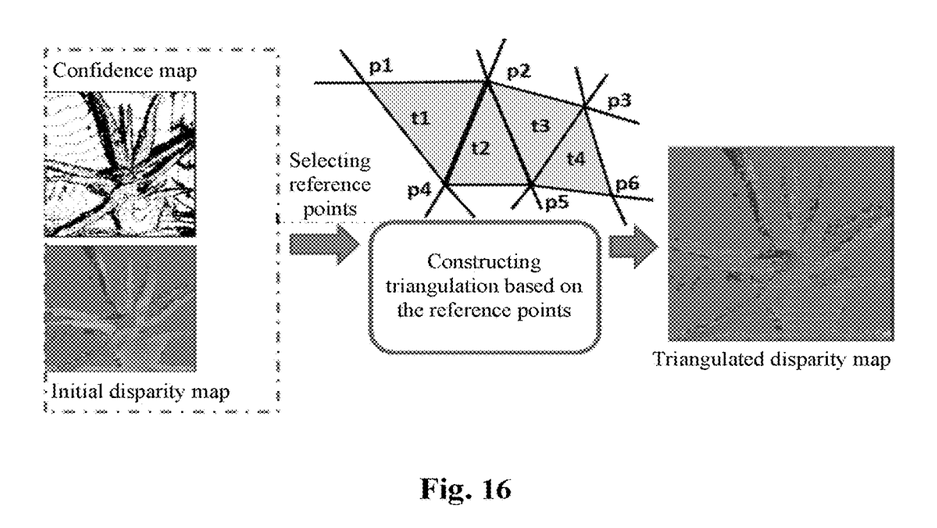
FIG. 16 is an exemplary diagram for illustrating a triangulation based on reference points.

Next, an example of optimization process according to the embodiment is illustrated with reference to FIG. 16. It should be understood that the embodiment of the present disclosure is not limited to specific details in the following example.

Based on the confidence map and the initial disparity map, pixels having confidences higher than a confidence threshold $T_0$ are selected as reference points according to the threshold, for example, $T_c \in [0.5, 0.7]$. In addition, the above spatial consistency filtering may be applied to remove the noise of the reference points. It is assumed that positions of a set of reference points determined finally are $\{p_i^g\}$, and corresponding disparity values and confidence values are $\{D_L(p_i^g)\}$ and $\{M_L(p_i^g)\}$, respectively. Based on the reference points $\{p_i^g\}$, a two-dimensional Delaunay triangulation may be performed to determine a set of connected triangles $\{H_n\}$ on the disparity map, as shown in FIG. 16. For a triangle $H_n$, its three vertices are three reference points $p_i^g=(x_i^g, y_i^g)$, $p_j^g=(x_j^g, y_j^g)$, and $p_k^g=(x_k^g, y_k^g)$, and corresponding disparity values are $D_L(p_i^g)=d_i^g$, $D_L(p_j^g)=d_j^g$ and $D_L(p_k^g)=d_k^g$. A three-dimensional plane equation $P_n$ fitted according to these vertices can be constructed. For a pixel position p=(x, y) in the triangle $H_n$, its disparity value is determined as $d_0$ by plane prediction. An energy equation in a MAP framework is constructed as Equation 1 below:

$$E(d) = -\log\left(\gamma + \exp\left(-\frac{(d-d_0)^2}{2\sigma^2}\right)\right) + \beta |c(I_L(p), I_R(p+d))| \quad (1)$$

where $\gamma$, $\beta$ and $\sigma$ are parameters, $|c(I_L(p), I_R(p+d))|$ corresponds to a block-matching cost for positions $I_L(p)$ and $I_R(p+d)$.

The optimal disparity can be determined on a pixel-by-pixel basis by minimizing a function of the equation 1. After the processing is performed on all pixels, an optimized disparity map can be obtained.

Figure 13:
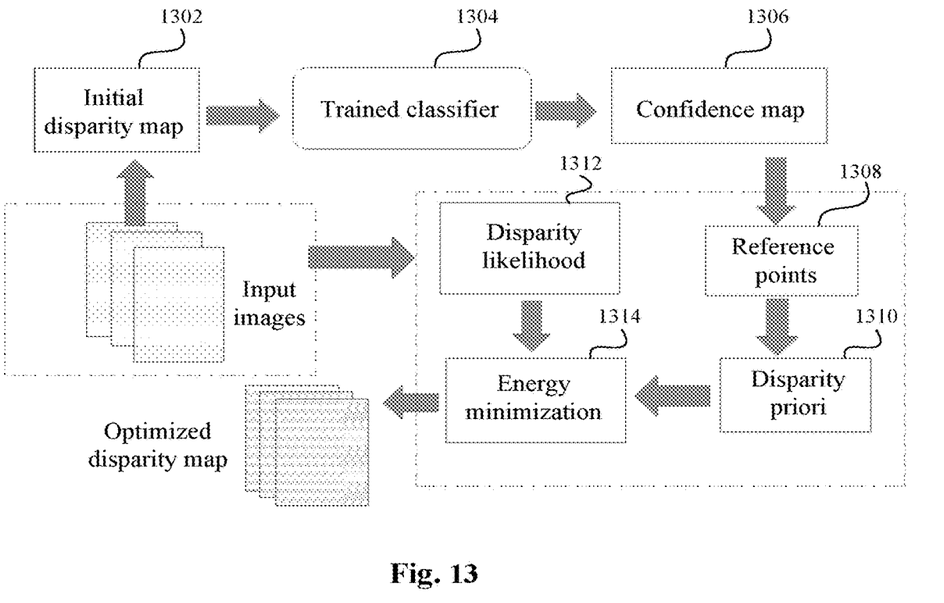
FIG. 13 is a schematic diagram for illustrating an example process of confidence prediction and disparity map optimization in a solution according to an embodiment of the present disclosure.

Next, an example process of confidence prediction and disparity map optimization is illustrated with reference to FIG. 13 as a brief summary of the above-described embodiment of the present disclosure, without repeating the details described above. First, an initial disparity map 1302 is obtained based on an input image; next, a trained classifier 1304 is applied to the initial disparity map to obtain a confidence map 1306; then a reference point 1308 is determined based on the confidence map, and a disparity priori 1310 is obtained based on the reference point; and minimization energy 1314 is calculated based on the disparity priori 1310 and a disparity likelihood ratio 1312 determined from the input image, to obtain an optimized disparity map.

With the above-described embodiment, an optimized disparity map can be obtained. In addition, further processing may be performed based on the optimized disparity map. For example, a depth map may be generated based on the disparity map, and three-dimensional reconstruction may be performed based on the depth map.

Figure 2:
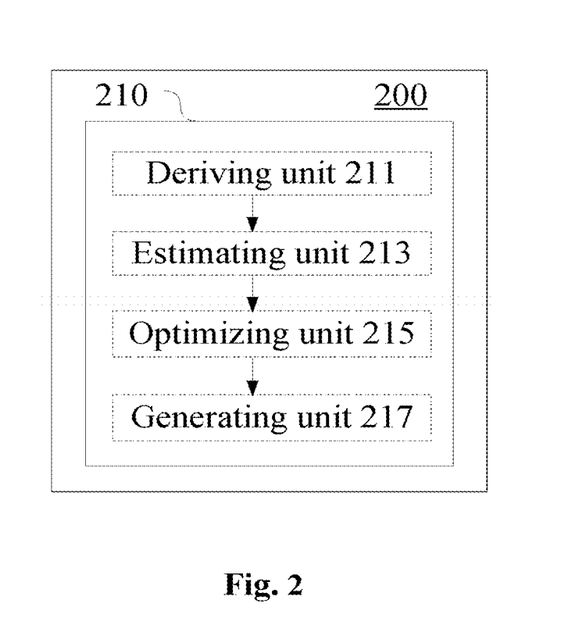
FIG. 2 is a block diagram showing a configuration example of an information processing apparatus according to another embodiment.

As shown in FIG. 2, an information processing apparatus 200 according to an embodiment includes a processing circuitry 210. The processing circuitry 210 includes a deriving unit 211, an estimating unit 213, an optimizing unit 215, and a generating unit 217. Configurations of the deriving unit 211, the estimating unit 213, and the optimizing unit 215 are similar to those of the deriving unit 111, the estimating unit 113, and the optimizing unit 115 illustrated above with reference to FIG. 1, respectively, and the description thereof is omitted here.

The generating unit 217 is configured to generate a depth map of the object based on a disparity map on which the optimization process has been performed.

Specifically, the generating unit 217 may generate a depth map from the optimized disparity map based on camera parameters. The camera parameters include, for example, internal parameters (a focal length, a principle point and a skew coefficient and the like) and external parameters (such as rotation and translation). A specific manner for calculating a depth value based on a disparity value, that is, converting the disparity map into the depth map, is known in the art and is not described here.

Figure 3:
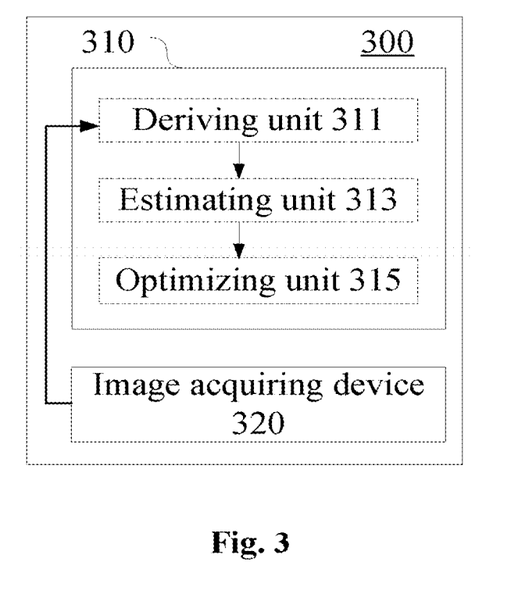
FIG. 3 is a block diagram showing a configuration example of an information processing apparatus according to yet another embodiment.

In addition, as described above, an information processing apparatus to which the embodiment of the present disclosure is applied may include a variety of apparatuses, which may include an apparatus having an image acquiring device. As shown in FIG. 3, an information processing apparatus 300 according to an embodiment includes a processing circuitry 310 and at least one image acquiring device 320.

The processing circuitry 310 includes a deriving unit 311, an estimating unit 313 and an optimizing unit 315, which are similar to the deriving unit 111, the estimating unit 113 and the optimizing unit 115 illustrated above with reference to FIG. 1, respectively.

The image acquiring device 320 is configured to capture multi-view images. For example, multi-view images may be acquired by multiple image acquiring devices 320 simultaneously from multiple viewing angles. Alternatively, images of the same scene may be acquired by a single image acquiring device 320 from multiple viewing angles to obtain multi-view images.

In addition, according to some embodiments of the present disclosure, further processing may be performed on the basis of a generated depth map.

Figure 4:
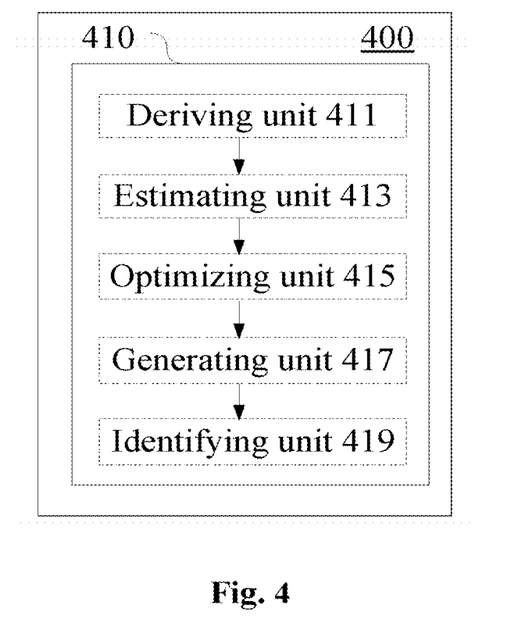
FIG. 4 is a block diagram showing a configuration example of an information processing apparatus according to still another embodiment.

According to an embodiment, identification processing on an object may be performed based on the generated depth map. As shown in FIG. 4, an information processing apparatus 400 according to an embodiment includes a processing circuitry 410. The processing circuitry 410 includes a deriving unit 411, an estimating unit 413, an optimizing unit 415, a generating unit 417, and an identifying unit 419. Configurations of the deriving unit 411, the estimating unit 413 and the optimizing unit 415 are similar to those of the deriving unit 111, the estimating unit 113 and the optimizing unit 115 illustrated above with reference to FIG. 1, respectively, and a configuration of the generating unit 417 is similar to that of the generating unit 217 illustrated above with reference to FIG. 2, and the description thereof is omitted here.

The identifying unit 419 is configured to identify a face expression, an action or a gesture of the object based on a depth map generated by the generating unit 417. In addition, although not shown, the processing circuitry 410 may further include a unit configured to generate a corresponding operation instruction based on the identified face expression, action, or gesture.

In addition, according to an embodiment, on the basis of generating the depth map, the processing circuitry may be further configured to perform virtual viewpoint rendering or generate visual information for augmented reality based on the depth map. By the virtual viewpoint rendering, an image with a viewing angle that is not included in the multi-view images can be obtained. In addition, the visual information for augmented reality may be displayed, for example, by superposing in a real scene.

Figure 5:
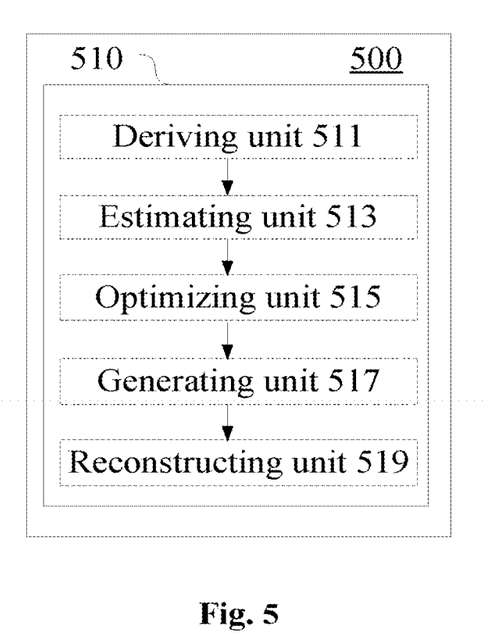
FIG. 5 is a block diagram showing a configuration example of an information processing apparatus according to another embodiment.

According to another embodiment, three-dimensional reconstruction may be performed based on a generated depth map. As shown in FIG. 5, an information processing apparatus 500 according to an embodiment includes a processing circuitry 510. The processing circuitry 510 includes a deriving unit 511, an estimating unit 513, an optimizing unit 515, a generating unit 517 and a reconstructing unit 519. Configurations of the deriving unit 511, the estimating unit 513 and the optimizing unit 515 are similar to those of the deriving unit 111, the estimating unit 113 and the optimizing unit 115 illustrated above with reference to FIG. 1, respectively, and a configuration of the generating unit 517 is similar to that of the generating unit 217 illustrated above with reference to FIG. 2, and the description thereof is omitted here.

The reconstructing unit 519 is configured to perform a three-dimensional reconstruction process of an object based on a depth map generated by the generating unit 517. The three-dimensional reconstruction process may include, for example, generation of a truncated signed distance field (TSDF), depth fusion and texture mapping of the object.

Figure 17:
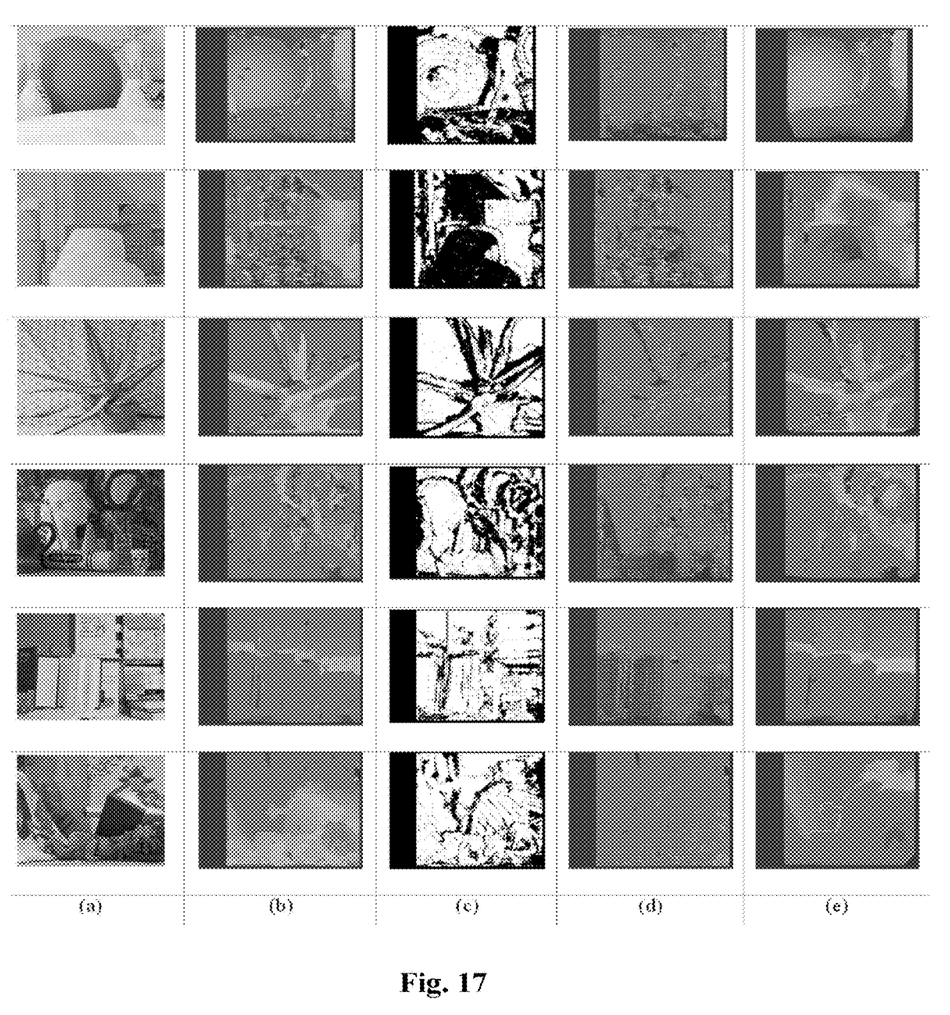
FIG. 17 is an exemplary diagram showing processing results at stages of a processing procedure according to an exemplary embodiment of the present disclosure.

FIG. 17 shows an example of an effect of disparity map optimization obtained by image processing according to an exemplary embodiment of the present disclosure. In FIG.

17: column (a) indicates an input image; column (b) indicates an original disparity map, which is a result of stereo matching based on the WTA strategy; column (c) indicates a result of reference points extracted by the least square boosting; column (d) indicates superposition of the Delaunay triangulation based on the reference points and the original disparity map; and column (e) indicates an optimized disparity map after the MAP minimization. In addition, rows in FIG. 17 correspond to *Bowling*1, *Lampshade*1, *Aloe, Art, Books and teddy* in the Middlebury stereo dataset, respectively, from top to bottom.

By comparing column (e) with column (b) in FIG. 17, it can be seen that, noises and artifacts are decreased in the optimized disparity map, and the quality of the optimized disparity map is obviously better than the original disparity map.

In the above description of the information processing apparatus according to the embodiment of the present disclosure, it is apparent that some methods and processes are also disclosed. An information processing method according to an embodiment of the present disclosure is illustrated in the following without repeating some specific details already described above.

Figure 6:
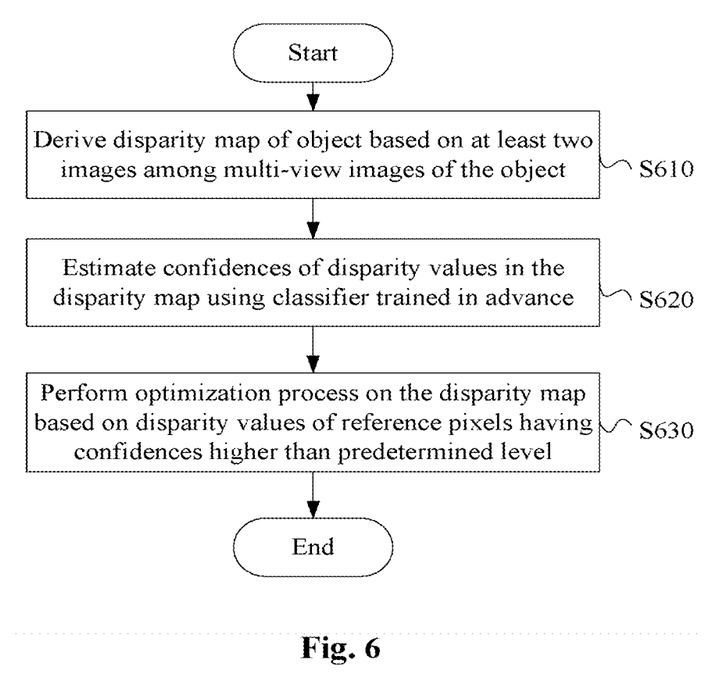
FIG. 6 is a flowchart showing a process example of an information processing method according to an embodiment of the present disclosure.

As shown in FIG. 6, an information processing method according to an embodiment includes the following steps.

In S610, a disparity map of an object is derived based on at least two images among multi-view images of the object.

In S620, confidences of disparity values in the disparity map are estimated using a classifier trained in advance.

In S630, an optimization process is performed on the disparity map based on disparity values of reference pixels having confidences higher than a predetermined level.

In the above embodiment, the confidence of the disparity value in the disparity map is estimated, and the optimization process is performed on the disparity map based on the confidence. In addition, according to another aspect of the present disclosure, a three-dimensional reconstruction processing may be performed using the confidence.

Figure 7:
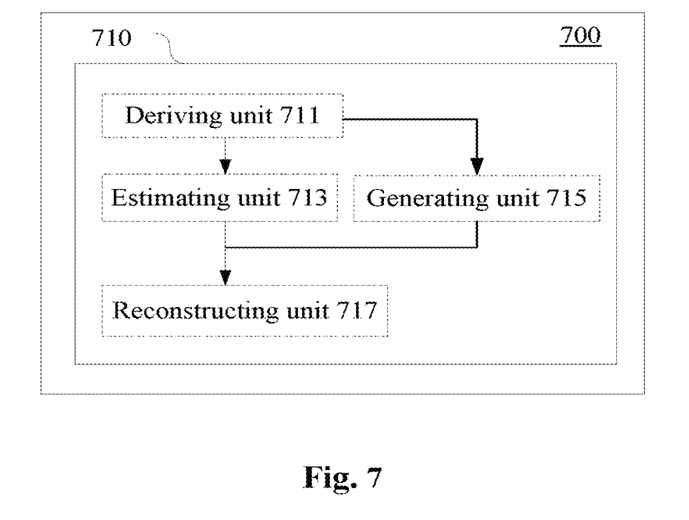
FIG. 7 is a block diagram showing a configuration example of an information processing apparatus according to another embodiment of the present disclosure.

As shown in FIG. 7, an information processing apparatus 700 according to an embodiment includes a processing circuitry 710. The processing circuitry 710 includes a deriving unit 711, an estimating unit 713, a generating unit 715 and a reconstructing unit 717.

The deriving unit 711 is configured to derive a disparity map of an object based on at least two images among multi-view images of the object.

The estimating unit 713 is configured to estimate confidences of disparity values in the disparity map using a classifier trained in advance.

The generating unit 715 is configured to generate a depth map of the object based on the disparity map.

The specific configurations of the deriving unit 711 and the estimating unit 713 may be similar to those of the deriving unit 111 and the estimating unit 113 illustrated above with reference to FIG. 1, and the specific configuration of the generating unit 715 may be similar to that of the generating unit 217 illustrated above with reference to FIG. 2. For the specific configurations of these units, one may refer to the configuration described above in conjunction with the specific embodiments.

The reconstructing unit 717 is configured to perform a three-dimensional reconstruction of the object from the depth map generated by the generating unit 715 based on the confidence estimated by the estimating unit 713.

According to an embodiment, the three-dimensional reconstruction performed by the reconstructing unit 717 may include: generating a truncated signed distance field (TSDF) from the depth map based on the confidence.

For example, a parameter $\delta$ which determines a width of a relevant near-surface region during the process of generating the TSDF may be set according to the confidence. More specifically, for example, the parameter $\delta$ is set as a first value if the confidence is above a predetermined level; and the parameter $\delta$ is set as a second value greater than the first value if the confidence is below the predetermined level.

Due to calibration errors, occlusions, low textures and repetitive patterns and the like, there is an uncertainty of depth estimation and noise in the depth map generated based on the disparity map. Estimated depths of different pixels may have different confidences (which correspond to confidences of the corresponding pixels in the disparity map). According to the embodiment, a weighted TSDF is provided, in which volume depth map fusion is performed with the confidence as a weight. A small weight is assigned for a TSDF corresponding to a depth with a low confidence (i.e., high uncertainty), and a large weight is assigned for a TSDF corresponding to a depth with a high confidence (i.e., low uncertainty), thereby improving the result of the three-dimensional reconstruction.

Figure 18:
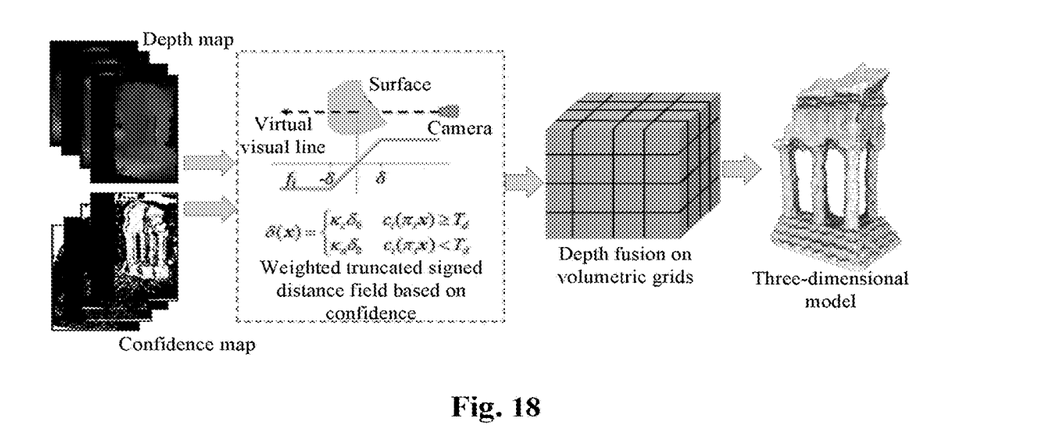
FIG. 18 is a schematic diagram for illustrating an example process of depth fusion.

Next, an example process of generating the TSDF is illustrated with reference to a schematic diagram of FIG. 18. It should be understood that the present disclosure is not limited to specific details in the following examples.

First, a depth map is obtained based on a disparity map and camera parameters and a confidence map is obtained based on the disparity map. It is assumed that $\pi_i$ is a projection converting a 3D point x to a 2D pixel p, and $d_i: \Omega_i \subset R^2 \rightarrow R$ is a depth map estimated based on a view i. The TSDF $f_i: R^3 \rightarrow [0, 2]$ is estimated for each voxel $x=B(i, j, k) \in B$ within a $N_x \times N_y \times N_z$ bounding volume $B \subset R^3$. (i, j, k) is the index of a voxel in the bounding volume. A signed distance $f_i(x)$ is defined by a visual line transmitted from a center of a camera i and passing through an image pixel. A signed distance from the center of the voxel to a surface point of the object is weighted by a factor of $1/\delta$, and the distance is truncated to match an interval $[-1, 1]$. Each voxel x should be relevant to a set of TSDFs $F=\{f_1, f_2, f_3, \ldots, f_n\}$, in which each element $f_i$ is generated according to a corresponding depth map. $\delta$ controls a width of the relevant near-surface region, and reflects an expected uncertainty of a depth value on z-axis. A large $\delta$ indicates that a corresponding depth has a large uncertainty.

Since $f_i(x)$ is converted from a depth $d_i(\pi_i, x)$, $\delta$ is set as $\delta=\kappa_c\delta_0$ if a confidence of a depth in $\pi_i x$ is higher than a predetermined threshold $T_d \in [0.5, 0.75]$; otherwise $\delta$ is set as $\delta=\kappa_n\delta_0$, as shown in the following Equation (2). $\kappa_c < \kappa_n$ and $\delta_0$ may be set to be equal to 2% of a minimum diameter of the bounding volume B.

$$\delta(x) = \begin{cases} \kappa_c\delta_0 & c_i(\pi_i x) \geq T_d \\ \kappa_n\delta_0 & c_i(\pi_i x) < T_d \end{cases} \quad (2)$$

Next, an information processing method according to an embodiment of the present disclosure is illustrated without repeating the details already described above.

Figure 8:
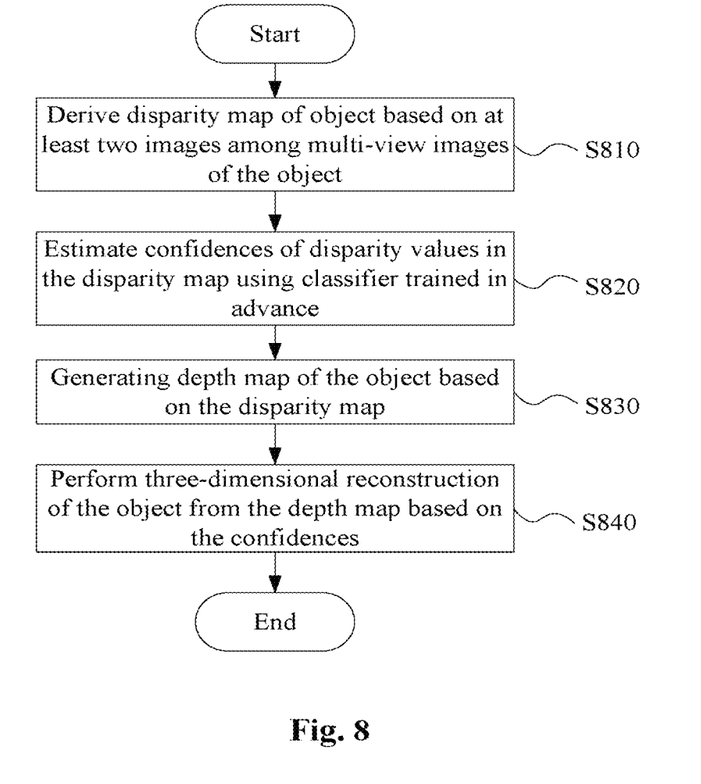
FIG. 8 is a flowchart showing a process example of an information processing method according to another embodiment of the present disclosure.

As shown in FIG. 8, an information processing method according to the present embodiment includes the following steps.

In S810, a disparity map of an object is derived based on at least two images among multi-view images of the object.

In S820, confidences of disparity values in the disparity map are estimated using a classifier trained in advance.

In S830, a depth map of the object is generated based on the disparity map.

In S840, a three-dimensional reconstruction of the object is performed from the depth map based on the confidences.

In the foregoing, the embodiment in which the confidence of the disparity value in the disparity map is estimated and the optimization process is performed on the disparity map based on the confidence and the embodiment in which the confidence of the disparity value in the disparity map is estimated and the three-dimensional reconstruction process is performed using the confidence are described respectively.

In addition, the above-mentioned aspects may be combined. That is, the confidence of the disparity value in the disparity map is estimated and the optimization process is performed on the disparity map based on the confidence, and the three-dimensional reconstruction is performed based on an optimized disparity map in consideration of the confidence.

Figure 12:
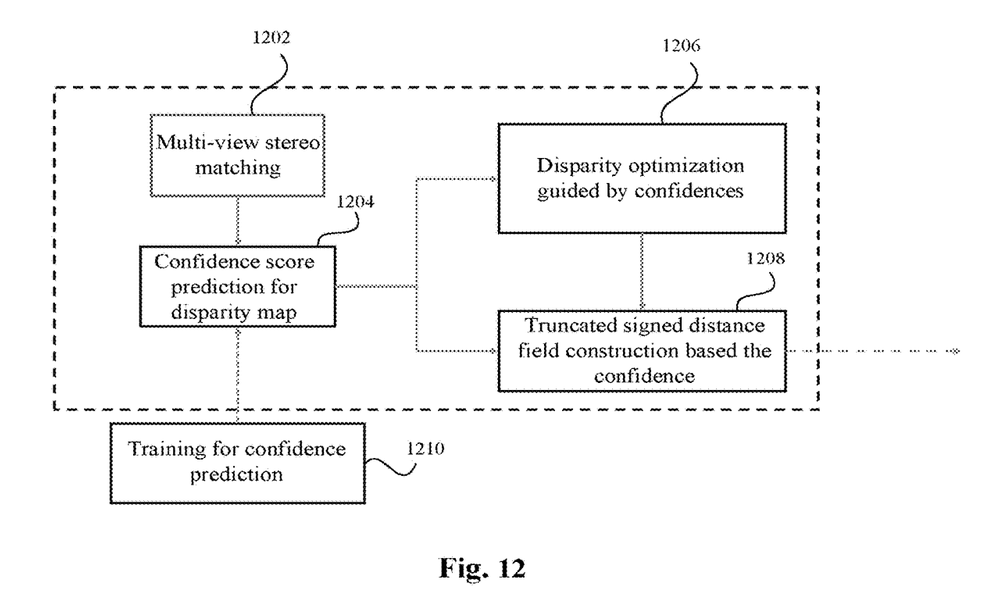
FIG. 12 is a schematic diagram for illustrating an overall framework of a solution according to an embodiment of the present disclosure.

Next, an overall framework of an exemplary embodiment of the present disclosure is illustrated with reference to FIG. 12. In 1202, multi-view stereo matching is performed to derive a disparity map; in 1204, confidence score prediction is performed on the disparity map, the prediction process utilizes the training results of 1210, where the processing in 1210 may be performed off-line; in 1206, disparity optimization is performed based on the confidence obtained in 1204; and in 1208, TSDF construction is performed based on an optimized disparity map (a depth map obtained from the disparity map) obtained in 1206 using the confidence obtained in 1204.

In addition, an information processing procedure according to an exemplary embodiment of the present disclosure may include the following aspects.

1. A classifier for extracting confidence scores is trained. For example, a least square boosting algorithm may be trained based on a set of features, and confidences of disparity are estimated using the trained least square boosting algorithm.

2. The quality of a disparity map is improved. For example, a disparity priori map may be calculated according to pixels having high confidence scores in the disparity map using triangulation. A likelihood cost of the disparity for each pixel is estimated based on block-matching on a narrow interval of the disparity prior. Energy composed of the priori and the likelihood cost is minimized and an optimal disparity map is estimated using a MAP framework.

3. Depth map fusion. For example, the disparity map is converted into a depth map based on calibrated camera parameters. A corresponding confidence score for the depth map provides an adaptive weighting for uncertainty parameters of a TSDF. A depth with a high reliability will have a high confidence score, and thus its truncated signed distance will have a high weight. Depth map fusion is performed on a volumetric grid based on a weighted TSDF.

With information processing according to the embodiment of the present disclosure, a more complete shape reconstruction can be achieved for objects with low textures, for example. In particular, reconstruction of objects having local specular reflection can be achieved, for example. Specular reflection regions usually have high uncertainty and a low confidence, and shapes of these regions can be predicted based on other high confidence regions by means of the processing such as confidence learning, disparity optimization and weighted TSDF. In addition, the information processing according to embodiments of the present disclosure can be further used for reconstruction of large-scale scenes. In disparity optimization, a MAP method can be performed pixel-by-pixel to optimize the disparity. The processing may be performed efficiently in parallel in a graphics processing unit (GPU), and may be used to process a large number of input image data. The proposed weighted TSDF can be integrated into an octree voxel for memory efficient large-scale scene representation.

Figure 19:
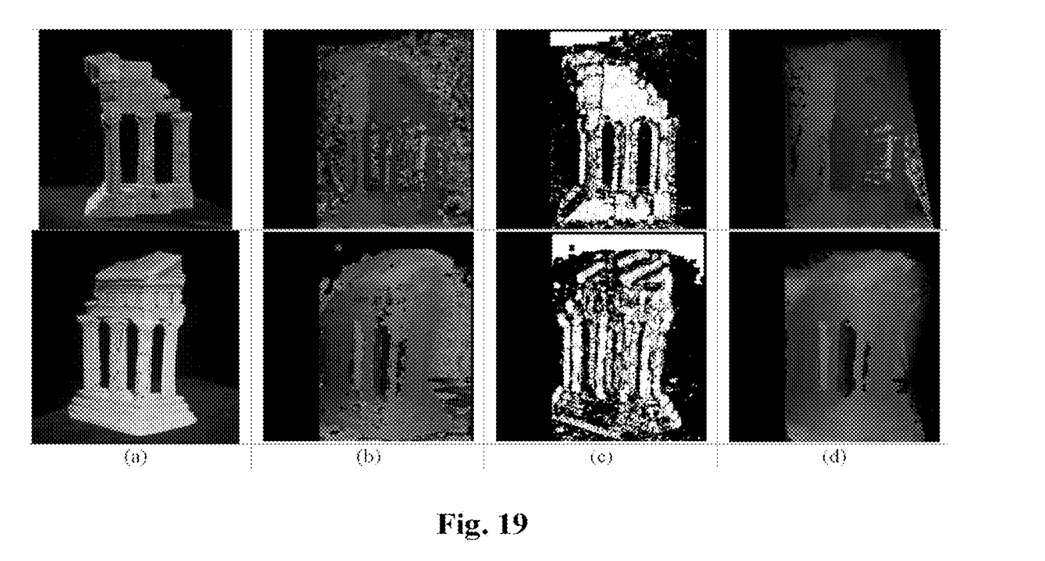
FIG. 19 and FIG. 20 show comparison of processing results according to an embodiment of the present disclosure with those according to other exemplary solutions.
Figure 20:
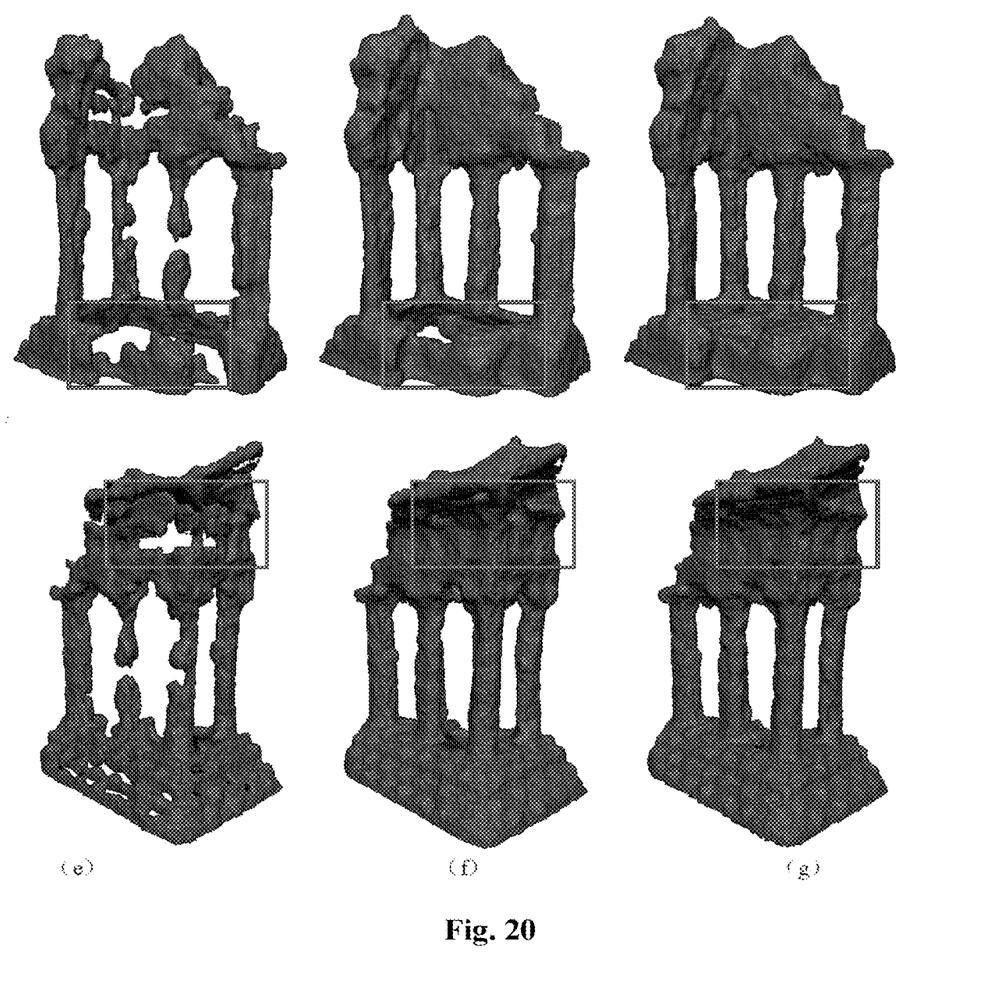

FIG. 19 and FIG. 20 show an example of a depth map fusion result, which show a depth map fusion result for temple sparse data in the Middlebury stereo dataset. The temple sparse data includes 16 images captured from different viewpoints, of which a 3D volume resolution is set as 200×200×200.

In FIG. 19, column (a) indicates input images of a temple sparse dataset, column (b) indicates corresponding disparity maps obtained by block-matching based on ZNCC, column (c) indicates corresponding confidence maps obtained by a least square boosting algorithm, and column (d) indicates optimized disparity maps obtained by a method according to an embodiment of the present disclosure.

In FIG. 20, column (e) indicates fusion results obtained by block-matching based on ZNCC, column (f) indicates fusion results obtained by optimizing the depth maps by the above-described embodiment according to the present disclosure in a case that the confidence is not considered when constructing the TSDF, and column (g) indicates fusion results obtained by optimizing the depth map by the above-described embodiment according to the present disclosure in a case that the confidence is considered when constructing the TSDF, in which the TSDF based on the confidence in equation (2) is used.

It can be seen from the results shown in FIG. 19 and FIG. 20, the quality of the optimized disparity map according to the embodiment of the present disclosure is significantly improved as compared with the disparity map subjected to block-matching based ZNCC. In the deep fusion, the reconstruction quality is further improved by considering the confidence in generating the TSDF.

Figure 9:
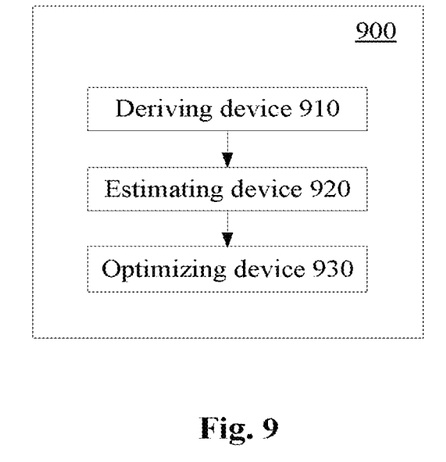
FIG. 9 is a block diagram showing a configuration example of an information processing apparatus according to an embodiment of the present disclosure.

As shown in FIG. 9, according to an embodiment, an information processing apparatus 900 is provided, which includes: a deriving device 910 configured to derive a disparity map of an object based on at least two images among multi-view images of the object; an estimating device 920 configured to estimate confidences of disparity values in the disparity map using a classifier trained in advance; and an optimizing device 930 configured to perform an optimization process on the disparity map based on disparity values of reference pixels having confidences higher than a predetermined level.

Figure 10:
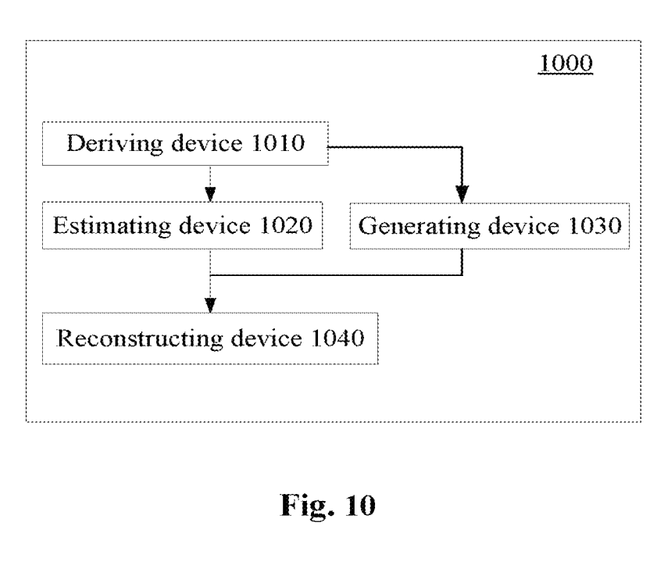
FIG. 10 is a block diagram showing a configuration example of an information processing apparatus according to another embodiment of the present disclosure.

As shown in FIG. 10, according to another embodiment, an information processing apparatus 1000 is provided, which includes: a deriving device 1010 configured to derive a disparity map of an object based on at least two images among multi-view images of the object; an estimating device 1020 configured to estimate confidences of disparity values in the disparity map using a classifier trained in advance; a generating device 1030 configured to generate a depth map of the object based on the disparity map; and a reconstructing device 1040 configured to perform a three-dimensional reconstruction of the object from the depth map based on the confidences.

As an example, steps of the above-described method and composing modules and/or units of the above-described device may be implemented as software, firmware, hardware, or a combination thereof. In a case of implementing by software or firmware, a program constituting the software for implementing the above-described method may be installed from a storage medium or a network to a computer (for example, a general-purpose computer 1100 shown in FIG. 11) having a dedicated hardware structure. The computer can perform various functions when being installed with various programs.

Figure 11:
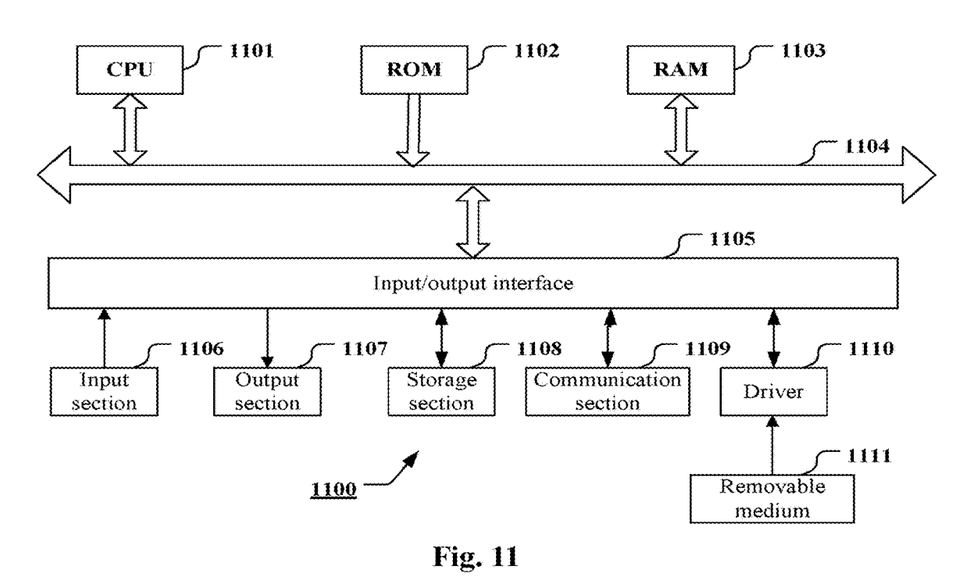
FIG. 11 is a block diagram showing an exemplary structure of a computer for implementing the method and the apparatus according to the present disclosure.

In FIG. 11, an central processing unit (i.e., a CPU) 1101 performs various types of processing according to programs stored in a read only memory (ROM) 1102 or programs loaded from a storage section 1108 to a random access memory (RAM) 1103. Data required when the CPU 1101 performs various types of processing is stored in the RAM 1103 as needed. The CPU 1101, the ROM 1102 and the RAM 1103 are connected to each other via a bus 1104. An input/output interface 1105 is also connected to the bus 1104.

The following components are connected to the input/output interface 1105: an input section 1106 (including a keyboard, a mouse or the like), an output section 1107 (including a display such as a cathode ray tube (CRT), a liquid crystal display (LCD), a loudspeaker or the like), a storage section 1108 (including a hard disk or the like), and a communication section 1109 (including a network interface card such as a LAN card, a modem or the like). The communication section 1109 performs communication processing via a network such as the Internet. A driver 1110 may also be connected to the input/output interface 1105 as needed. A removable medium 1111 such as a magnetic disk, an optical disk, a magneto-optical disk and a semiconductor memory may be installed on the driver 1110 as needed, such that the computer programs read from the removable medium 1111 are installed in the storage section 1108 as needed.

In a case that the series of processing described above is implemented by software, programs constituting the software are installed from a network such as the Internet or a storage medium such as the removable medium 1111.

Those skilled in the art should understand that the storage medium is not limited to the removable medium 1111 shown in FIG. 11 in which programs are stored and which is distributed separately from the apparatus to provide the programs to the user. An example of the removable medium 1111 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 1102, a hard disk included in the storage section 1108 or the like. The programs are stored in the storage medium, and the storage medium is distributed to the user together with the device including the storage medium.

According to an embodiment of the present disclosure, a program product storing machine-readable instruction codes is further provided. When read and executed by a machine, the instruction codes cause the machine to perform the above-described method according to the embodiment of the present disclosure.

Accordingly, a storage medium for carrying the above-described program product storing the machine-readable instruction codes is also included in the present disclosure. The storage medium includes, but not limited to, a floppy disk, an optical disk, a magneto-optical disk, a storage card, a memory stick or the like.

In the above description of specific embodiments of the present disclosure, the features described and/or illustrated with respect to one embodiment may be used in one or more other embodiments in the same or similar manner, may be combined with features in other embodiments, or may replace features in other embodiments.

It should be noted that the term "comprising/including" as used herein refers to the presence of a feature, element, step, or component, but does not exclude the presence or addition of one or more other features, elements, steps or components.

In the above embodiments and examples, reference numerals consist of numerals are used to represent steps and/or units. It should be understood by those skill in the art that these reference numerals are used for facilitating description and illustration only and are not intended to represent an order or limit in any other manner.

In addition, the method of the present disclosure is not limited to be performed in a chronological order described in the specification, but may also be performed in other chronological order, in parallel or independently. Therefore, the order for executing the method described in this specification does not limit the technical scope of the present disclosure.

Although the present disclosure has been described by specific embodiments according to the present disclosure, it should be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents shall be construed as being included within the scope of protection of the present disclosure.

The invention claimed is:

1. An information processing apparatus, comprising:
processing circuitry configured to
derive a disparity map of an object based on at least two images among multi-view images of the object;
estimate confidences of disparity values in the disparity map using a classifier trained in advance; and
perform an optimization process on the disparity map based on disparity values of reference pixels having confidences higher than a predetermined level,
wherein the optimization process further comprises:
triangulating the disparity map based on positions of the reference pixels,
determining an energy function respectively for each of triangular regions with the reference pixels as vertexes, and
optimizing disparity values of pixels in a corresponding triangular region based on the determined energy function.

2. The information processing apparatus according to claim 1, wherein the optimization process further comprises: dividing the disparity map into regions based on the positions of the reference pixels, and performing the optimization process on different regions in the disparity map independently.

3. The information processing apparatus according to claim 1, wherein the classifier is obtained based on training images using a least square boosting algorithm.

4. The information processing apparatus according to claim 1, wherein the deriving the disparity map of the object comprises:
calculating, for a target pixel in a first image among the multi-view images, matching costs between the target pixel and pixels in a predetermined range in a second image among the multi-view images; and determining a corresponding pixel, of the target pixel, in the second image based on the matching costs, thereby determining a disparity value of the target pixel.

5. The information processing apparatus according to claim 4, wherein the matching costs are calculated by a block-matching based on zero mean normalized cross correlation.

6. The information processing apparatus according to claim 5, wherein the training of the classifier and the estimation of the confidences are performed based on one or more of:
a minimum cost of the block-matching;
a difference between a minimum cost and a second minimum cost of the block-matching;
a difference between a disparity value determined for the target pixel in the first image and a disparity value determined for the corresponding pixel in the second image; and
a difference between a disparity value of a pixel and a median disparity value of neighboring pixels of the pixel.

7. The information processing apparatus according to claim 1, wherein the processing circuitry is further configured to determine a pixel, among pixels having confidences higher than a predetermined level, which satisfies the following condition as the reference pixel:
there are at least a predetermined number of pixels, among the neighboring pixels of the pixel, having disparity differences from the pixel less than a predetermined threshold.

8. The information processing apparatus according to claim 1, wherein the processing circuitry is further configured to
generate a depth map of the object based on the disparity map on which the optimization process has been performed.

9. The information processing apparatus according to claim 8, wherein the generating of the depth map comprises: generating the depth map, based on camera parameters, from the disparity map on which the optimization process has been performed.

10. The information processing apparatus according to claim 8, wherein the processing circuitry is further configured to: identify a face expression, an action or a gesture of the object based on the depth map; and generate a corresponding operation instruction based on the identified face expression, action or gesture.

11. The information processing apparatus according to claim 8, wherein the processing circuitry is further configured to perform a virtual viewpoint rendering or generate visual information for augmented reality based on the depth map.

12. The information processing apparatus according to claim 8, wherein the processing circuitry is further configured to:
perform a three-dimensional reconstruction process of the object based on the depth map, wherein the three-dimensional reconstruction process comprises at least one of a generation of a truncated signed distance field, a depth fusion and a texture mapping of the object.

13. The information processing apparatus according to claim 1, further comprising:
one or more image acquiring devices configured to capture the multi-view images.

14. An information processing method, comprising:
deriving a disparity map of an object based on at least two images among multi-view images of the object;
estimating confidences of disparity values in the disparity map using a classifier trained in advance; and
performing an optimization process on the disparity map based on disparity values of reference pixels having confidences higher than a predetermined level, wherein the optimization process further comprises:
triangulating the disparity map based on positions of the reference pixels,
determining an energy function respectively for each of triangular regions with the reference pixels as vertexes, and
optimizing disparity values of pixels in a corresponding triangular region based on the determined energy function.

15. An information processing apparatus, comprising:
processing circuitry configured to
derive a disparity map of an object based on at least two images among multi-view images of the object;
estimate confidences of disparity values in the disparity map using a classifier trained in advance;
generate a depth map of the object based on the disparity map;
perform a three-dimensional reconstruction of the object from the depth map based on the confidences;
triangulate the disparity map based on positions of reference pixels;
determine an energy function respectively for each of triangular regions with the reference pixels as vertexes; and
optimize disparity values of pixels in a corresponding triangular region based on the determined energy function.

16. The information processing apparatus according to claim 15, wherein the three-dimensional reconstruction comprises: generating a truncated signed distance field from the depth map based on the confidences.

17. The information processing apparatus according to claim 16, wherein a parameter $\delta$ which determines a width of a relevant near-surface region during the process of generating the truncated signed distance field is set according to the confidences.

18. The information processing apparatus according to claim 17, wherein the parameter $\delta$ is set as a first value if the confidence is above a predetermined level, and the parameter $\delta$ is set as a second value greater than the first value if the confidence is below the predetermined level.

19. An information processing method, comprising:
deriving a disparity map of an object based on at least two images among multi-view images of the object;
estimating confidences of disparity values in the disparity map using a classifier trained in advance;
generating a depth map of the object based on the disparity map;
performing a three-dimensional reconstruction of the object from the depth map based on the confidences;
triangulating the disparity map based on positions of reference pixels;
determining an energy function respectively for each of triangular regions with the reference pixels as vertexes; and
optimizing disparity values of pixels in a corresponding triangular region based on the determined energy function.

* * * * *